(12) United States Patent
Liu

(10) Patent No.: US 8,587,221 B2
(45) Date of Patent: Nov. 19, 2013

(54) DC/DC CONVERTER WITH MULTIPLE OUTPUTS

(75) Inventor: Da Liu, Milpitas, CA (US)

(73) Assignee: O2Micro, Inc., Santa Clara, CA (US)

( * ) Notice: Subject to any disclaimer, the term of this patent is extended or adjusted under 35 U.S.C. 154(b) by 189 days.

(21) Appl. No.: 13/331,265

(22) Filed: Dec. 20, 2011

(65) Prior Publication Data

US 2012/0153866 A1 Jun. 21, 2012

Related U.S. Application Data

(63) Continuation-in-part of application No. 12/973,460, filed on Dec. 20, 2010, now Pat. No. 8,531,123.

(51) Int. Cl.
 *G05F 1/00* (2006.01)
(52) U.S. Cl.
 USPC ........ 315/307; 315/185 S; 315/291; 315/247; 315/312

(58) Field of Classification Search
 USPC ............... 315/291, 307, 185 S, 247, 224, 315/276–279, 158, 312
 See application file for complete search history.

(56) References Cited

U.S. PATENT DOCUMENTS 7,221,111 B2   5/2007   Hirosawa
2012/0068982 A1   3/2012   Lee et al.

*Primary Examiner* — Tuyet Thi Vo

(57) ABSTRACT

Embodiments of the invention provide a DC/DC converter. The DC/DC converter includes a transformer, a switch controller and a driver controller. The transformer has a primary winding coupled to a power source, a first secondary winding provides a first output voltage to a first load, and a second secondary winding provides a second output voltage to a second load. The switch controller is coupled to the primary winding and controls a first switch coupled to the primary winding to control input power to the primary winding and to regulate the first output voltage based on a power requirement of the first load. The driver controller is coupled to the second secondary winding and generates a pulse modulation signal to alternately turn on and turn off a second switch coupled to the second secondary winding to regulate the second output voltage based on a power requirement of the second load.

19 Claims, 12 Drawing Sheets

DC/DC CONVERTER WITH MULTIPLE OUTPUTS

RELATED APPLICATIONS

This application is a continuation-in-part of the co-pending U.S. application Ser. No. 12/973,460, titled "DC/DC Converter with Multiple Outputs," filed on Dec. 20, 2010, which is hereby incorporated by reference in its entirety.

BACKGROUND

A display system usually includes an illuminating module and a control module. The illuminating module includes one or more light sources, e.g., multiple light-emitting diode (LED) strings. The control module which may include a micro-controller, a video processor and an audio processor controls the on/off and dimming of the illuminating module and processes the video and audio signals. The power requirement of the illuminating module and the power requirement of the control module may be different. Thus, an input AC voltage is converted to a first DC voltage to power the illuminating module and a second DC voltage different from the first DC voltage to power the control module.

FIG. 1 illustrates an example of a conventional display system 100. An AC/DC converter 104 receives an AC voltage from an AC power source 102 and outputs a DC voltage VIN. A transformer 130 receives the DC voltage VIN at a primary winding 106, generates an output voltage VOUT1 at a first secondary winding 110, and generates an output voltage VOUT2 at a second secondary winding 108. The output voltage VOUT1 is used to power a control module 128 which includes a micro controller, a video processor and an audio processor. The output voltage VOUT2 is used to power an illuminating module 126 which includes multiple LED strings. The control module 128 generates an ON/OFF signal to turn on or turn off the illuminating module 126, and generates a dimming signal DIM to adjust the brightness of the illuminating module 126. An error amplifier 118 senses VOUT1 through a voltage divider 120 and controls an optocoupler 116 to generate a feedback signal FB indicative of VOUT1. A DC/DC controller 114 receives the feedback signal FB and generates a pulse signal to control a switch 112 which is coupled in series with the primary winding 106. By controlling the switch 112, the power delivered from the primary winding 106 to the secondary winding 110 is adjusted such that VOUT1 is regulated to a first level to satisfy a power requirement of the control module 128. By controlling the switch 112, VOUT2 also varies. A power converter, e.g., a boost converter 122, is coupled between the secondary winding 108 and the illuminating module 126. The boost converter 122 regulates VOUT2 to a second level to satisfy a power requirement of the illuminating module 126. Thus, in order to generate the output voltage VOUT2 which has a different voltage level from the output voltage VOUT1, an extra power converter (e.g., the boost converter 122) is used, which increases the cost of the system.

FIG. 2 illustrates another example of a conventional display system 200. Elements labeled the same as in FIG. 1 have similar functions. The conventional display system 200 includes a first transformer 230 and a second transformer 232. The first transformer 230 generates a first output voltage VOUT1 to power a control module 128. The second transformer 232 generates a second output voltage VOUT2 to power an illuminating module 126. A first DC/DC controller 214 controls a first switch 204 in series with a primary winding of the first transformer 230 to adjust the output voltage VOUT1 based on a feedback signal FB1 from a first optocoupler 236. A second DC/DC controller 216 controls a second switch 202 in series with a primary winding of the second transformer 232 to adjust the output voltage VOUT2 based on a feedback signal FB2 from a second optocoupler 234. Therefore, an extra DC/DC controller 216, an extra transformer 232 and an extra optocoupler 234 are used, which also increase the cost of the system.

SUMMARY

Embodiments of the invention provide a DC/DC converter. The DC/DC converter includes a transformer, a switch controller and a driver controller. The transformer has a primary winding coupled to a power source, a first secondary winding that provides a first output voltage to a first load, and a second secondary winding that provides a second output voltage to a second load. The switch controller is coupled to the primary winding and controls a first switch coupled to the primary winding so as to control input power to the primary winding and to regulate the first output voltage based on a power requirement of the first load. The driver controller is coupled to the second secondary winding and generates a pulse modulation signal to alternately turn on and turn off a second switch coupled to the second secondary winding so as to regulate the second output voltage based on a power requirement of the second load.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
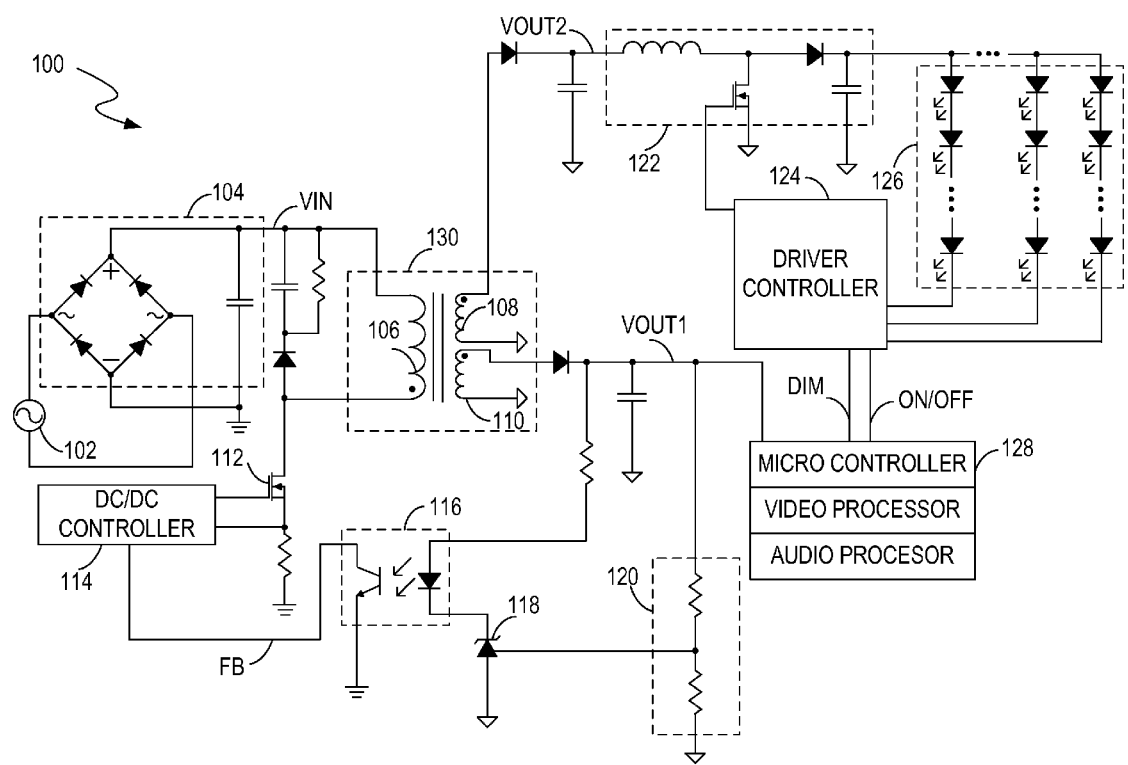
FIG. 1 illustrates an example of a conventional display system.
Figure 2:
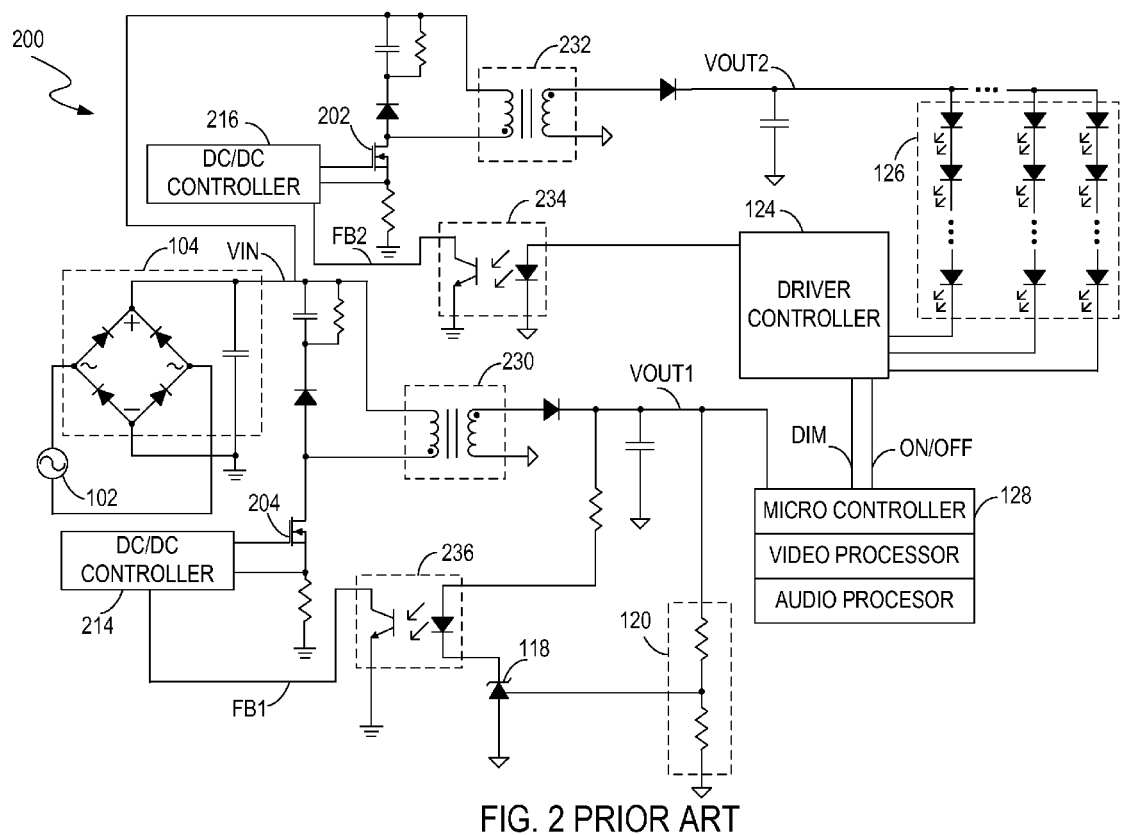
FIG. 2 illustrates another example of a conventional display system.
Figure 3:
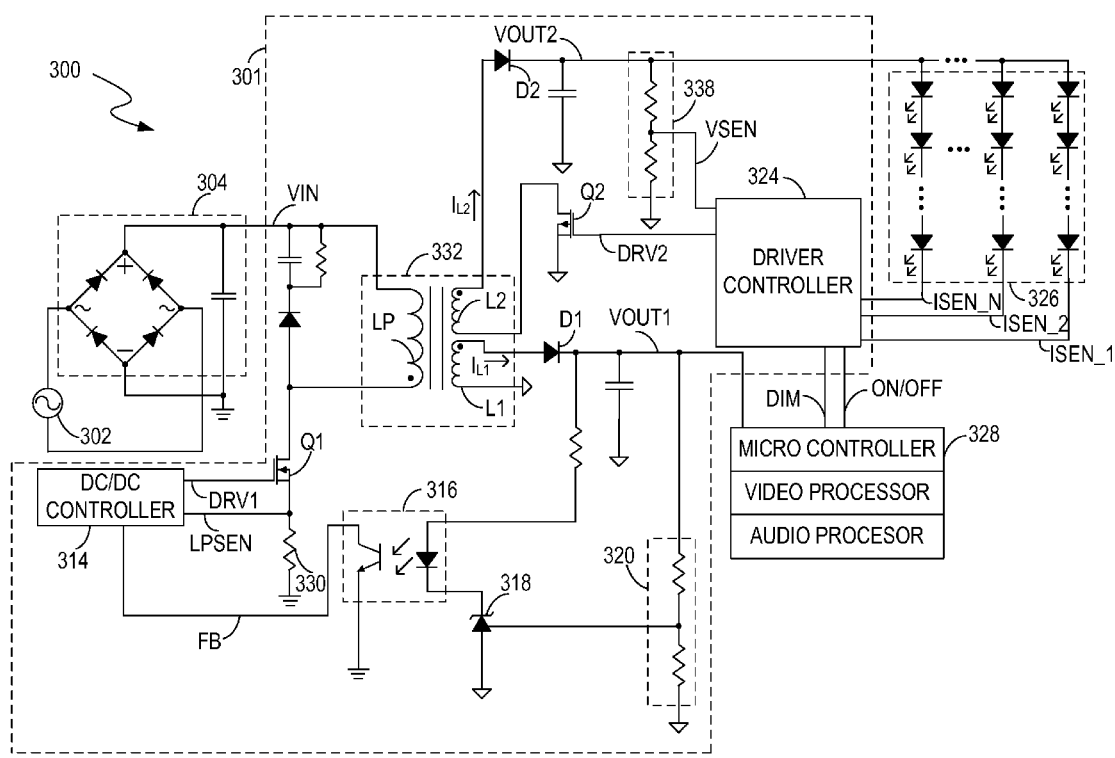
FIG. 3 illustrates a display system, in accordance with one embodiment of the present invention.

FIG. 3 illustrates a display system 300, in accordance with one embodiment of the present invention. The display system 300 includes an AC/DC converter (e.g., including a bridge rectifier 304) for converting an AC voltage from an AC power source 302 to a DC voltage VIN, and a DC/DC converter 301 for converting the DC voltage VIN to a first output voltage VOUT1 and a second output voltage VOUT2. The DC/DC converter 301 includes a transformer 332 coupled to the bridge rectifier 304. The transformer 332 includes a primary winding LP, a secondary winding L1 and a secondary winding L2. The DC/DC converter 301 further includes a switch Q1 coupled in series with the primary winding LP of the transformer 332, a switch Q2 coupled in series with the secondary winding L2, a DC/DC controller 314 coupled to the switch Q1 for controlling input power to the primary winding LP to regulate the output voltage VOUT1, and a driver controller 324 for controlling the switch Q2 to regulate the output voltage VOUT2. In the example of FIG. 3, the switch Q1 is an n-type metal-oxide-semiconductor field-effect transistor (NMOSFET) and the switch Q2 is a p-type metal-oxide-semiconductor field-effect transistor (PMOSFET).

In operation, the transformer 332 receives the DC voltage VIN at the primary winding LP, and provides two output voltages VOUT1 and VOUT2 at the secondary windings L1 and L2 respectively. The output voltage VOUT1 is supplied to a control module 328 which includes a micro controller, a video processor and an audio processor, in one embodiment. The micro-controller can control the video processor and the audio processor, e.g., according to an input from a user, to adjust the video and audio outputs. The output voltage VOUT2 can be supplied to an illuminating module 326 which includes one or more light sources, e.g., multiple LED strings. The control module 328 generates an ON/OFF signal to turn on or turn off the illuminating module 326, and generates a dimming signal DIM to adjust the brightness of the illuminating module 326. An error amplifier 318 senses VOUT1 via a voltage sensor, e.g., a voltage divider 320, coupled to the secondary winding L1, and controls an optocoupler 316 to generate a feedback signal FB indicative of VOUT1. The DC/DC controller 314 receives the feedback signal FB from the optocoupler 316 and a sensing signal LPSEN from a current sensor 330 coupled in series with the switch Q1, and generates a control signal DRV1 to control the switch Q1 so as to regulate VOUT1 to a first voltage. In one embodiment, the control signal DRV1 is a pulse modulation signal, e.g., a pulse-width modulation (PWM) signal. The sensing signal LPSEN indicates a current flowing through the primary winding LP.

The driver controller 324 receives sensing signals ISEN_1, ISEN_2, . . . ISEN_N indicating currents through the LED strings in the illuminating module 326 respectively, and receives a sensing signal VSEN indicating the voltage VOUT2 of the secondary winding L2. In one embodiment, the sensing signal VSEN is obtained from a voltage sensor, e.g., a voltage divider 338 coupled to the secondary winding L2. The driver controller 324 generates a control signal DRV2 according to the sensing signals ISEN_1, ISEN_2, . . . ISEN_N and VSEN to control the switch Q2 so as to regulate VOUT2 to a target voltage. In one embodiment, the control signal DRV2 is a pulse modulation signal, e.g., a PWM signal. The driver controller 324 also controls the ON/OFF status and dimming of the illuminating module 326 based on the ON/OFF signal and the dimming signal DIM generated by the control module 328.

Figure 4:
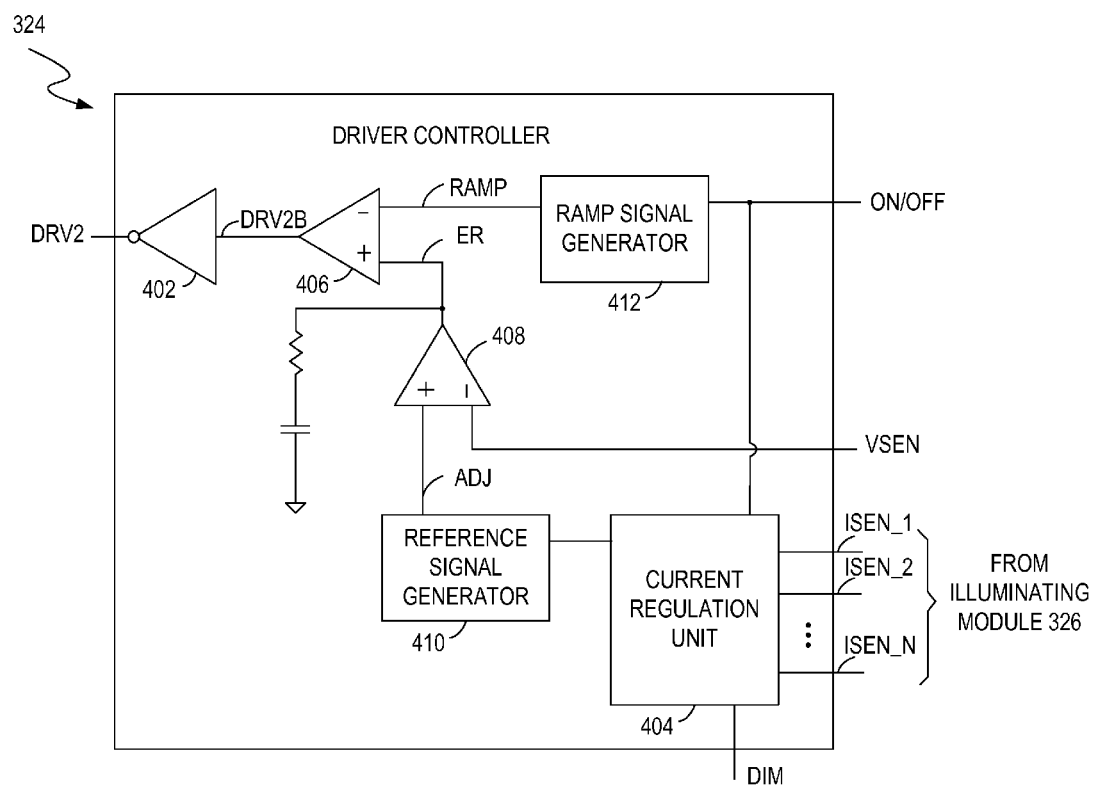
FIG. 4 illustrates an example of a driver controller in FIG. 3, in accordance with one embodiment of the present invention.

FIG. 4 illustrates an example of the driver controller 324 in FIG. 3, in accordance with one embodiment of the present invention. In the example of FIG. 4, the driver controller 324 includes a current regulation unit 404, a reference signal generator 410, an error amplifier 408, a ramp signal generator 412, a comparator 406, and an inverter buffer 402. FIG. 4 is described in combination with FIG. 3.

In one embodiment, the current regulation unit 404 is operable for balancing the currents through the LED strings in the illuminating module 326 such that the current through each LED string is substantially the same according to a target current level. As used herein, the term "substantially the same" means that the current through the LED strings may vary but within a range so that the LED strings can generate desirable light outputs with a relatively uniform brightness.

Furthermore, the current regulation unit 404 adjusts the output voltage VOUT2 to satisfy a power requirement of the illuminating module 326. More specifically, the current regulation unit 404 adjusts the output voltage VOUT2 such that a voltage drop across each LED string is sufficient to enable each LED string to generate a current that is substantially the same as the target current level, in one embodiment. The current regulation unit 404 receives the sensing signals ISEN_1, ISEN_2, . . . ISEN_N and controls the reference signal generator 410 accordingly to generate a reference signal ADJ based on a power requirement of the illuminating module 326. In one embodiment, the current regulation unit 404 can control the reference signal generator 410 to increase the reference signal ADJ so as to increase the output voltage VOUT2, and vice versa.

The error amplifier 408 receives the reference signal ADJ and the sensing signal VSEN indicative of VOUT2, and generates an error signal ER by comparing the reference signal ADJ to the sensing signal VSEN. If the reference signal ADJ increases, the error amplifier 408 increases the error signal ER, in one embodiment. The comparator 406 compares the error signal ER with the ramp signal RAMP generated by the ramp signal generator 412 to generate a signal DRV2B. In one embodiment, the inverter buffer 402 inverts the signal DRV2B and outputs a control signal DRV2 through the inverter buffer 402 to control the switch Q2, e.g., a PMOSFET, coupled in series with the secondary winding L2. In the example of FIG. 4, the signal DRV2B and the control signal DRV2 are pulse modulation signals, e.g., PWM signals. If the control signal DRV2 is in a first state (e.g., digital 0), the switch Q2 is on. If the control signal DRV2 is in a second state (e.g., digital 1), the switch Q2 is off. A duty cycle of DRV2 is determined by the error signal ER. If the error signal ER increases, the comparator 406 increases a duty cycle of the control signal DRV2B, in one embodiment. Consequently, the conduction duty cycle of the switch Q2 is increased. Therefore, an average current flowing through the secondary winding L2 is increased and thus the output voltage VOUT2 is increased.

Figure 5:
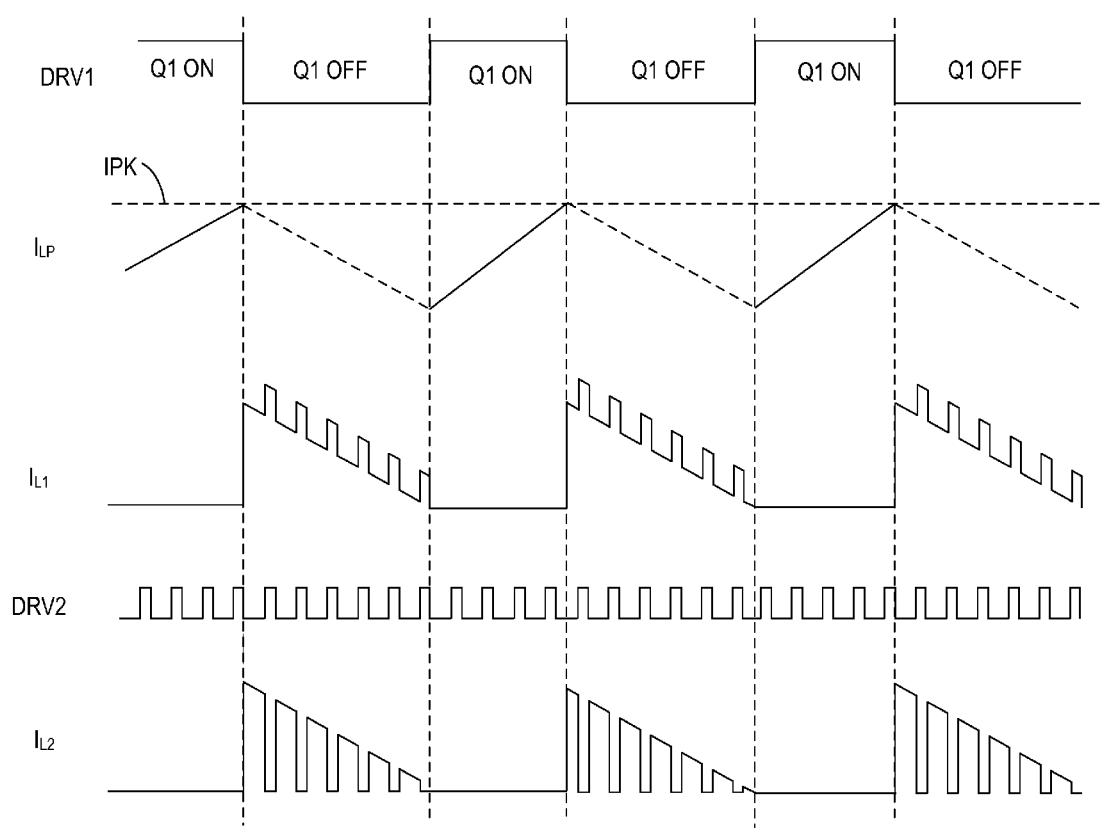
FIG. 5 illustrates an example of waveforms associated with the display system in FIG. 3, in accordance with one embodiment of the present invention.

FIG. 5 illustrates an example of waveforms associated with the display system 300 in FIG. 3, in accordance with one embodiment of the present invention. FIG. 5 is described in combination with FIG. 3. More specifically, FIG. 5 shows the control signal DRV1 generated by the DC/DC controller 314, the status of the switch Q1, the current $I_{LP}$ flowing through the primary winding LP, the current $I_{L1}$ flowing through the secondary winding L1, the control signal DRV2 generated by the driver controller 324, and the current $I_{L2}$ flowing through the secondary winding L2.

In operation, the DC/DC controller 314 receives the sensing signal LPSEN indicating the current $I_{LP}$ flowing through the primary winding LP, and generates the control signal DRV1 to control the switch Q1. If the DRV1 is in a first state, e.g., digital 1, the switch Q1 is on, the current $I_{LP}$ flowing through the primary winding LP increases. When the switch Q1 is on, there is no current flowing through the secondary windings L1 and L2 because a diode D1 coupled to the secondary winding L1 and a diode D2 coupled to the secondary winding L2 are both reverse-biased. When the voltage of the sensing signal LPSEN increases to a predetermined voltage, which indicates that the current $I_{LP}$ reaches a predetermined current level IPK, the DC/DC controller 314 generates the control signal DRV1 in a second state, e.g., digital 0, to turn off the switch Q1. When the switch Q1 is off, the current $I_{LP}$ of the primary winding LP decreases to zero. Accordingly, a current $I_{L1}$ of the secondary winding L1 and a current $I_{L2}$ of the secondary winding L2 decreases and are both regulated by the switch Q2. The conductance state of the switch Q2 is controlled by the control signal DRV2. Assume that the number of turns of the primary winding LP is NP, the number of turns of the secondary winding L1 is N1, and the number of turns of the secondary winding L2 is N2. If the control signal DRV2 is in the first state, the switch Q2 is on, and thus the current $I_{L1}$ flows from the secondary winding L1 through the diode D1 to the control module 328, and the current $I_{L2}$ flows from ground through the switch Q2, the secondary winding L2, the diode D2 to the illuminating module 326. When the switch Q2 is on, and $I_{L1}$ and $I_{L2}$ can be given by:

$$NP*I_{LP}=N1*I_{L1}+N2*I_{L2}. \quad (1)$$

If the control signal DRV2 is in the second state, the switch Q2 is off and $I_{L2}$ remains cut-off. When the switch Q2 is off, $I_{L1}$ can be given by:

$$NP*I_{LP}=N1*I_{L1}. \quad (2)$$

For illustration purposes, assume that the current $I_{LP}$ decreases to zero gradually when the switch Q2 is off, although in some applications the current $I_{LP}$ may drop to zero immediately once the switch Q2 is off. In one embodiment, the transformer 332 operates in a constant frequency mode in which the control signal DRV1 has a fixed frequency and an adjustable duty cycle. In another embodiment, both the frequency and the duty cycle of the control signal DRV1 are adjustable.

As described in relation to FIG. 3 and FIG. 5, the DC/DC controller 314 regulates the output voltage VOUT1 generated at the secondary winding L1 by controlling the input power to the primary winding LP. More specifically, the DC/DC controller 314 controls the switch Q1 coupled in series with the primary winding LP based on the feedback signal FB and the sensing signal LPSEN. The feedback signal FB indicates the output voltage VOUT1. The sensing signal LPSEN indicates the current $I_{LP}$ of the primary winding LP. The driver controller 324 regulates the output voltage VOUT2 generated at the secondary winding L2 by controlling the switch Q2 coupled in series with the secondary winding L2 based on the sensing signals ISEN_1, ISEN_2, ... ISEN_N and the sensing signal VSEN. The sensing signals ISEN_1, ISEN_2, ... ISEN_N indicate the currents through the LED strings in the illuminating module 326 respectively. The sensing signal VSEN indicates the output voltage VOUT2. As a result, the boost converter 122 in the conventional display system 100 or the DC/DC controller 216, the transformer 232 and the optocoupler 234 in the conventional display system 200 can be eliminated, and thus the cost is reduced.

Figure 6:
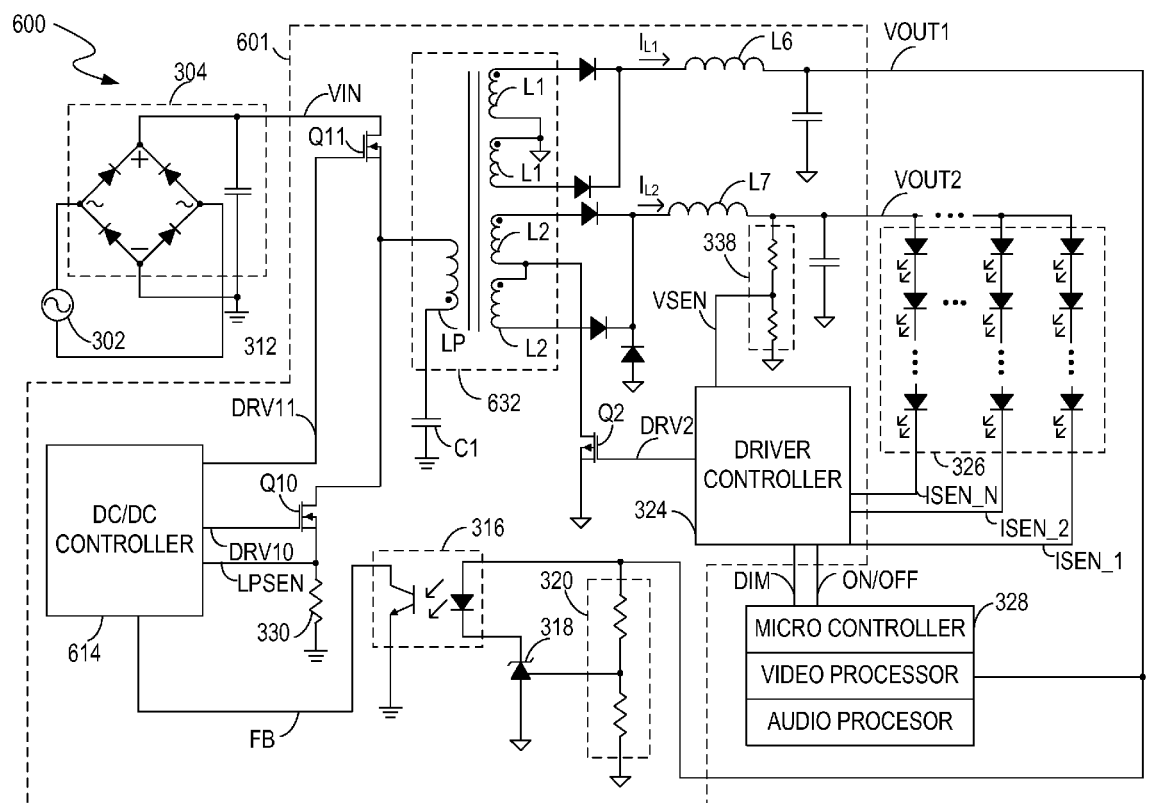
FIG. 6 illustrates a display system, in accordance with another embodiment of the present invention.
Figure 7:
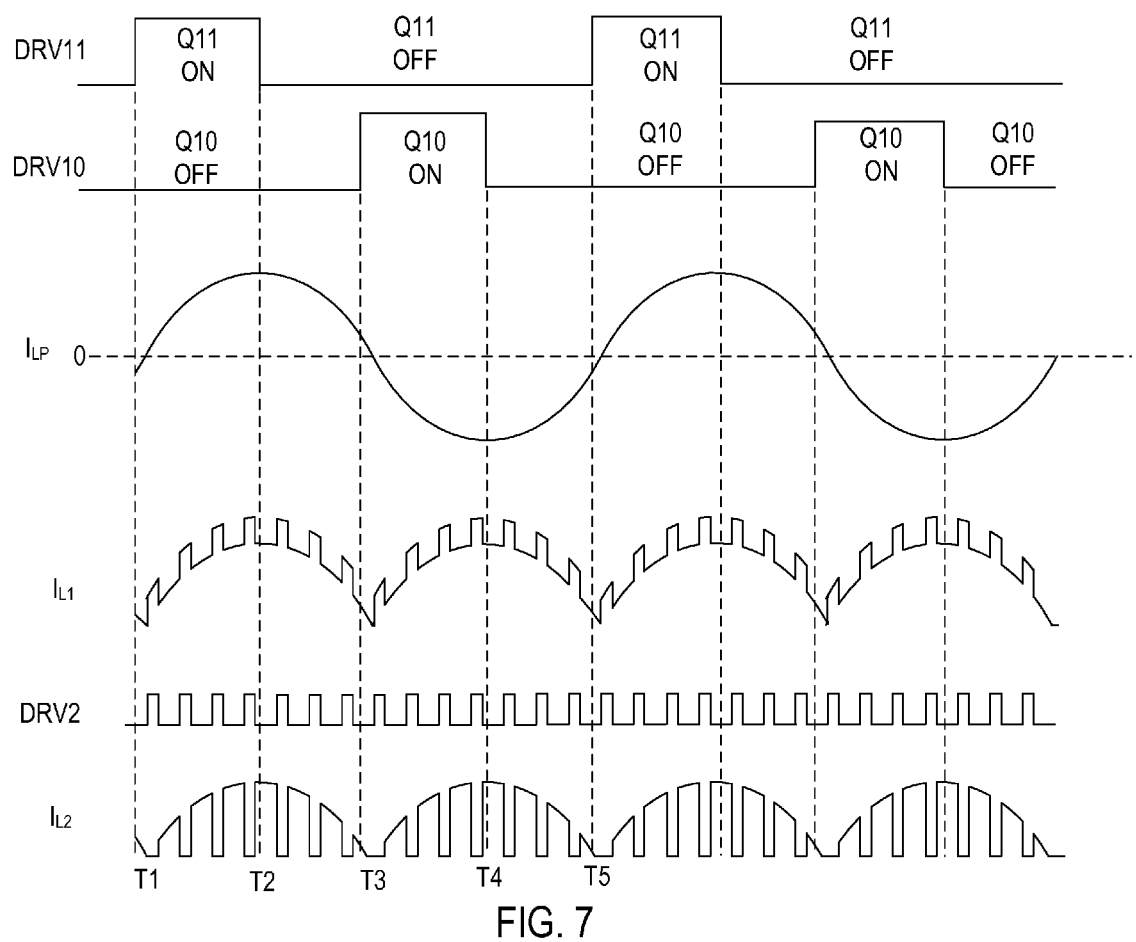
FIG. 7 illustrates an example of waveforms associated with the display system in FIG. 6, in accordance with one embodiment of the present invention.

FIG. 6 illustrates a display system 600, in accordance with another embodiment of the present invention. Elements labeled the same as in FIG. 3 have similar functions. FIG. 7 illustrates an example of waveforms associated with the display system 600 in FIG. 6, in accordance with one embodiment of the present invention. FIG. 6 is described in combination with FIG. 7.

The display system 600 includes an AC/DC converter (e.g., including a bridge rectifier 304) for converting an AC voltage from an AC power source 302 to a DC voltage VIN, and a DC/DC converter 601 for converting the DC voltage VIN to a first output voltage VOUT1 and a second output voltage VOUT2. The DC/DC converter 601 includes a transformer 632 coupled to the bridge rectifier 304. In the example of FIG. 6, the transformer 632 includes a primary winding LP, a secondary winding L1 and a secondary winding L2. In one embodiment, the secondary winding L1 is tapped and has a tap point coupled to ground. The secondary winding L2 is also tapped and has a tap point coupled to ground through a switch Q2. The DC/DC converter 601 further includes a switch Q11 coupled between the bridge rectifier 304 and the primary winding LP, a switch Q10 coupled between the primary winding LP and ground, a DC/DC controller 614 coupled to the switches Q10 and Q11 for controlling input power to the primary winding LP to regulate the output voltage VOUT1, and a driver controller 324 coupled to the switch Q2 and for controlling the switch Q2 to regulate the output voltage VOUT2.

In the example of FIG. 6, the switch Q10 and the switch Q11 are NMOSFETs and controlled by control signals DRV10 and DRV11 respectively. The control signals DRV10 and DRV11 are generated by the DC/DC controller 614 based on a feedback signal FB which indicates the output voltage VOUT1 and based on a sensing signal LPSEN indicates the current $I_{LP}$ flowing through the primary winding LP. The sensing signal LPSEN is provided by a current sensor 330 coupled in series with the primary winding LP. For example, the sensing signal LPSEN can be utilized by the DC/DC controller 614 to detect an over-current condition.

In the example of FIG. 6, the switch Q2 is a PMOSFET and controlled by a control signal DRV2. The control signal DRV2 is generated by a driver controller 324 based on a sensing signal VSEN and sensing signals ISEN_1, ISEN_2, ... ISEN_N. In one embodiment, the control signal DRV2 is a pulse modulation signal, e.g., a PWM signal. If the control signal DRV2 is in a first state, the switch Q2 is on. If the control signal DRV2 is in a second state, the switch Q2 is off. The sensing signal VSEN indicates the output voltage VOUT2. The sensing signals ISEN_1, ISEN_2, ... ISEN_N indicate the currents through the LED strings in the illuminating module 326 respectively.

In operation, the DC/DC controller 614 generates the control signals DRV10 and DRV11 to alternately turn on the switches Q10 and Q11 to control the input power to the primary winding LP of the transformer 632. In one embodiment, both the control signals DRV10 and DRV11 are pulse signals with a predetermined duty cycle and an adjustable frequency. The frequency of DRV10 and DRV11 are determined by the DC/DC controller 614 based on a power requirement of the control module 328. The switch Q10 is on when the control signal DRV10 is in a first state (e.g., digital 1) and is off when the control signal DRV10 is in a second state (e.g., digital 0). The switch Q11 is on when the control signal DRV11 is in a first state (e.g., digital 1) and is off when the control signal DRV11 is in a second state (e.g., digital 0).

Initially, the DC/DC controller 614 turns on the switch Q11 at time T1 and maintains the switch Q10 off, in one embodiment. From time T1 to time T2, the switch Q11 is on and the switch Q10 is off, and the current $I_{LP}$ flows from the bridge rectifier 304 through the switch Q11 and the primary winding LP and charges an energy storage element, e.g., a capacitor C1, coupled to the primary winding LP. At time T2, the DC/DC controller 614 turns off the switch Q11 and maintains the switch Q10 off. From time T2 to time T3, both switches Q10 and Q11 are off, and the current $I_{LP}$ flows from ground through the body diode of the switch Q10 and the primary winding LP. Then, the DC/DC controller 614 turns on the switch Q10 at time T3 and maintains the switch Q11 off. From time T3 to time T4, the switch Q10 is on and the switch Q11 is off, and the current $I_{LP}$ flows from ground through the switch Q10 and the primary winding LP until the current $I_{LP}$ decreases to a reference, e.g., zero. After the current $I_{LP}$ decreases to zero, the capacitor C1 discharges, and the current $I_{LP}$ flows from the capacitor C1, through the primary winding LP and the switch Q10 to ground. Then, the DC/DC controller 614 turns off the switch Q10 at time T4. From time T4 to time T5, both switches Q10 and Q11 are off, and the current $I_{LP}$ flows from the capacitor C1 through the primary winding LP, the body diode of the switch Q11 and the bridge rectifier 304 to ground. The DC/DC controller 614 then turns on the switch Q11 again at time T5. Therefore, by controlling the switches Q11 and Q10, the power from the bridge rectifier 304 to the primary winding LP is controlled.

The current $I_{L1}$ is generated by the secondary winding L1. The output voltage VOUT1 is proportional to the average value of the current $I_{L1}$. The DC/DC controller 614 adjusts the frequency of the control signals DRV10 and DRV11 to adjust an average value of the current $I_{L1}$. In one embodiment, if the feedback signal FB generated by the optocoupler 316 indicates that the output voltage VOUT1 is greater than a desired voltage for the control module 328, the DC/DC controller 614 increases the frequency of the control signals DRV10 and DRV11 to decreases the average value of the current $I_{L1}$. As a result, the output voltage VOUT1 is decreased accordingly. Similarly, if the output voltage VOUT1 is less than the desired voltage for the control module 328, the DC/DC controller 614 decreases the frequency of the control signals DRV10 and DRV11 to increases the average value of the current $I_{L1}$. As a result, the output voltage VOUT1 is increased accordingly. As such, the output voltage VOUT1 is regulated to a desired voltage which can satisfy a power requirement of the control module 328.

If the switch Q2 is on, the current $I_{L2}$ is generated by the secondary winding L2 and is proportional to the absolute value of the current $I_{LP}$. When the switch Q2 is on, the current $I_{L2}$ flows from ground through the switch Q2 and portion of the secondary winding L2 to the illuminating module 326. If the switch Q2 is off, the current $I_{L2}$ remains cut-off. Thus, the average value of the current $I_{L2}$ is proportional to a conduction duty cycle of the switch Q2, which is further determined by the control signal DRV2. The output voltage VOUT2 is proportional to the average value of the current $I_{L2}$. The driver controller 324 adjusts the duty cycle of the control signal DRV2 based on the sensing signal VSEN and sensing signals ISEN_1, ISEN_2, . . . ISEN_N such that the output voltage VOUT2 is regulated to a voltage which can satisfy a power requirement of the illuminating module 326.

Assume that the number of turns of the primary winding LP is NP, the absolute value of the current $I_{LP}$ is $I'_{LP}$, the tap point of the secondary winding L1 divides the secondary L1 into a first portion with N11 turns and a second portion with N12 turns, the tap point of the secondary winding L2 divides the secondary L2 into a first portion with N21 turns and a second portion with N22 turns. The current $I_{L1}$ flows through the inductor L6 to the control module 328, and the current $I_{L2}$ flows through the inductor L7 to the illuminating module 326. If the control signal DRV2 is in the first state, the switch Q2 is on, the current $I_{LP}$ is in a first half cycle, and $I_{L1}$ and $I_{L2}$ can be given by:

$$NP*I_{LP}=N11*I_{L1}N21*I_{L2}. \tag{3}$$

If the control signal DRV2 is in the first state, the switch Q2 is on, the current $I_{LP}$ is in a second half cycle, and $I_{L1}$ and $I_{L2}$ can be given by:

$$NP*I'_{LP}=N12*I_{L1}+N22*I_{L2}. \tag{4}$$

If the control signal DRV2 is in the second state, the switch Q2 is off and $I_{L2}$ remains cut-off. When the switch Q2 is off and the current $I_{LP}$ is in a first half cycle, $I_{L1}$ can be given by:

$$NP*I_{LP}=N11*I_{L1}. \tag{5}$$

When the switch Q2 is off and the current $I_{LP}$ is in a second half cycle, $I_{L1}$ can be given by:

$$NP*I'_{LP}=N12*I_{L1}. \tag{6}$$

Figure 8:
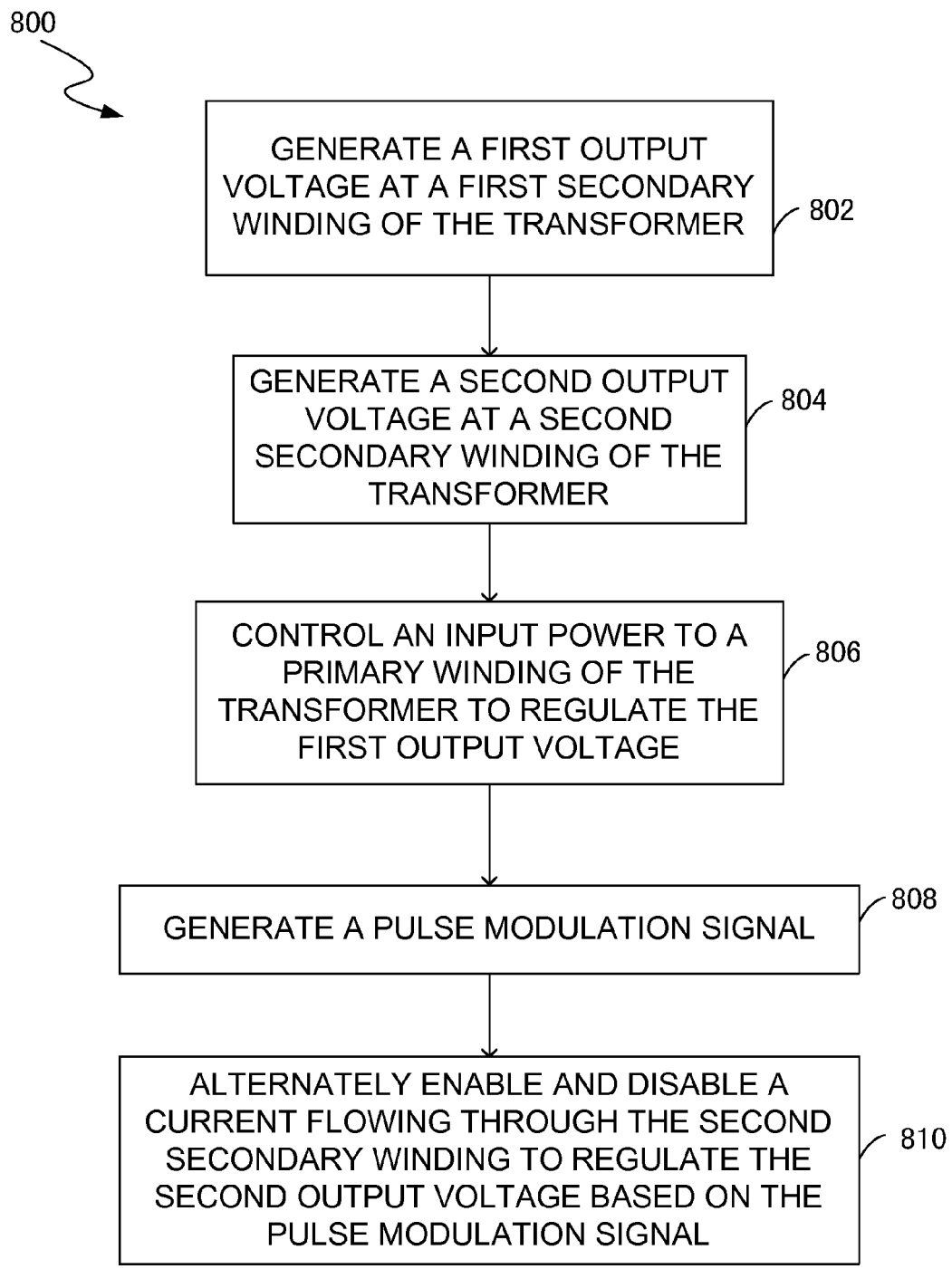
FIG. 8 illustrates a flowchart of a method for controlling a transformer to generate multiple output voltages, in accordance with one embodiment of the present invention.

FIG. 8 illustrates a flowchart of a method for controlling a transformer to generate multiple regulated output voltages, in accordance with one embodiment of the present invention. FIG. 8 is described in combination with FIG. 3 and FIG. 6.

In block 802, a first output voltage is generated at a first secondary winding L1 of a transformer (e.g., the transformer 332 in FIG. 3 or the transformer 632 in FIG. 6). In block 804, a second output voltage is generated at a second secondary winding L2 of the transformer. In block 806, input power received by the transformer at a primary winding LP is controlled to regulate the first output voltage.

In block 808, a pulse modulation signal is generated (e.g., by a driver controller 324 in FIG. 3 or by a driver controller 324 in FIG. 6). In block 810, a current flowing through the second secondary winding L2 is alternately enabled and disabled to regulate the second output voltage based on the pulse modulation signal. For example, a switch (e.g., the switch Q2 in FIG. 3 or the switch Q2 in FIG. 6) coupled to the second secondary winding L2 is controlled by the pulse modulation signal in order to regulate the second output voltage. If the pulse modulation signal is in a first state, the switch is on, a current flows through the second secondary winding L2 to a load. If the pulse modulation signal is in a second state, the switch is off, the current flowing through the second secondary winding L2 remains cut-off.

Accordingly, the present invention provides DC/DC converters with multiple regulated outputs. The DC/DC converters control input power to a primary winding of a transformer to regulate a first output voltage generated by a first secondary winding, and control a switch coupled to a second secondary winding of the transformer to regulate a second output voltage generated by the second secondary winding. The DC/DC converters according to the present invention can be used in a display system. As such, the extra components such as a boost converter or a second transformer used in the prior arts for regulating the second output voltage can be eliminated, and thus the cost is reduced.

Figure 9:
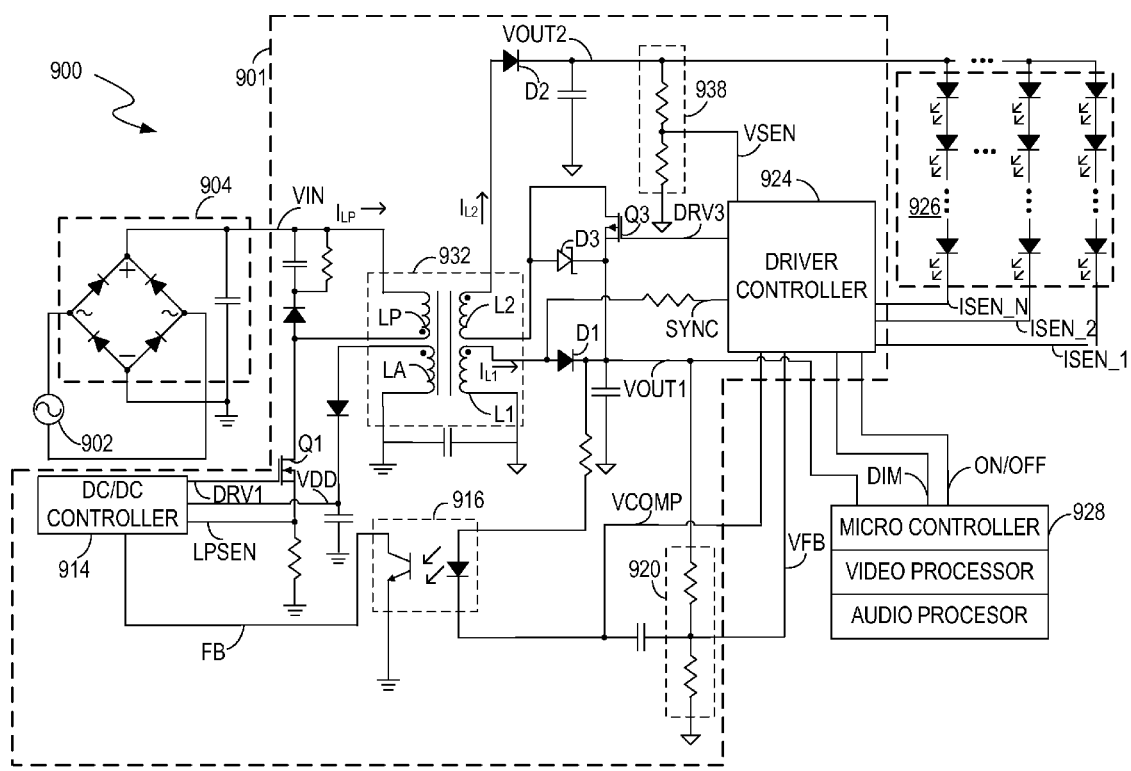
FIG. 9 illustrates a display system, in accordance with another embodiment of the present invention.

FIG. 9 illustrates a display system 900, in accordance with another embodiment of the present invention. The display system 900 includes an AC/DC converter (e.g., including a bridge rectifier 904) for converting an AC voltage from an AC power source 902 to a DC voltage VIN, and a DC/DC converter 901, respectively. The DC/DC converter 901 converts the DC voltage VIN to a first output voltage VOUT1 and a second output voltage VOUT2 for driving a first load and a second load. In one embodiment, the DC/DC converter 901 includes a transformer 932 coupled to the bridge rectifier 904, a switch controller (e.g., a DC/DC controller 914), and a driver controller 924. The transformer 932 includes a primary winding LP coupled to the power source 902, a secondary winding L1 for providing the output voltage VOUT1 to the first load (for example, a control module 928) and a secondary winding L2 for providing the output voltage VOUT2 to the second load (for example, an illuminating module 926). The transformer 932 further includes an auxiliary winding LA for providing a supply voltage VDD to the DC/DC controller 914, in one embodiment. The DC/DC controller 914 coupled to primary winding LP is operable for controlling a switch Q1 coupled to the primary winding LP so as to control input power to the primary winding LP and to regulate the output voltage VOUT1 based on a power requirement of the control module 928. The driver controller 924 is coupled to the secondary winding L2 and operable for generating a pulse modulation signal to alternately turn on and turn off a switch Q3 coupled in series with the secondary winding L2 to regulate the output voltage VOUT2 based on a power requirement of the illuminating module 926. In the example of FIG. 9, the switch Q1 is an n-type metal-oxide-semiconductor field-effect transistor (NMOSFET) and the switch Q3 is a p-type metal-oxide-semiconductor field-effect transistor (PMOSFET). In the example of FIG. 9, the source of the switch Q3 receives the output voltage VOUT1 from the secondary winding L1. The switch Q3 is on when its source-to-gate voltage Vsg is greater than a threshold.

In the example of FIG. 9, the switch Q3 is located outside the driver controller 924. Alternatively, the switch Q3 can be included in the driver controller 924. The DC/DC converter 901 further includes a transient voltage suppressor, e.g., a diode D3, coupled between the source and the drain of the switch Q3 and operable for protecting the DC/DC converter 901 from an over-voltage condition. The diode D3 can dissipate the energy induced by the leakage inductance of the transformer 932 and the parasitic inductance of the printed circuit board (PCB) trace. When the transient voltage of the DC/DC converter 901 exceeds a predetermined level, the diode D3 breaks down to avoid the over-voltage condition of the DC/DC converter 901.

In operation, the transformer 932 receives the DC voltage VIN at the primary winding LP, and provides output voltages VOUT1 and VOUT2 at the secondary windings L1 and L2 respectively. In the example of FIG. 9, the output voltage VOUT1 is supplied to the control module 928 which includes a micro controller, a video processor and an audio processor. The micro-controller can control the video processor and the audio processor, e.g., according to an input from a user, to adjust the video and audio outputs. The output voltage VOUT2 is supplied to the illuminating module 926 which includes a plurality of light sources, e.g., multiple LED strings. The control module 928 generates an ON/OFF signal to turn on or turn off the illuminating module 926, and generates a dimming signal DIM to adjust the brightness of the illuminating module 926.

The DC/DC controller 914 coupled between an optocoupler 916 and the primary winding LP is operable for receiving a feedback signal FB indicative of a target level of the output voltage VOUT1 and receiving a sensing signal LPSEN indicative of the current $I_{LP}$ flowing through the primary winding LP. The DC/DC controller 914 regulates the output voltage VOUT1 based on the feedback signal FB and the sensing signal LPSEN. In one embodiment, the DC/DC controller 914 is operable for generating a control signal DRV1 (e.g., a pulse-width modulation (PWM) signal) to alternately turn on and turn off the switch Q1, and for regulating the output voltage VOUT1 by adjusting the duty cycle of the control signal DRV1. If the control signal DRV1 is in a first state (e.g., digital 1), the switch Q1 is on. A current $I_{LP}$ flows through the primary winding LP. No current flows through the secondary windings L1 and L2 because a diode D1 coupled to the secondary winding L1 and a diode D2 coupled to the secondary winding L2 are both reverse-biased. If the control signal DRV1 is in a second state (e.g., digital 0), the switch Q1 is off, a current $I_{L1}$ flows through the secondary winding L1 and a current $I_{L2}$ flows through the secondary winding L2 because the diode D1 and D2 are forward biased.

In one embodiment, if the current through the optocoupler 916 (i.e., the feedback signal FB) is greater than a predetermined current, indicating that the actual output voltage VOUT1 is greater than the target level of the output voltage VOUT1, the DC/DC controller 914 decreases a predetermined peak current level IPK of the current $I_{LP}$ through the primary winding LP. When the voltage of the sensing signal LPSEN increases to a predetermined voltage, indicating that the current $I_{LP}$ reaches the predetermined current level IPK, the DC/DC controller 914 generates the control signal DRV1 in the second state, e.g., digital 0, to turn off the switch Q1. Accordingly, the duty cycle of the control signal DRV1 is decreased. Similarly, the DC/DC controller 914 increases the duty cycle of the control signal DRV1 if the actual output voltage VOUT1 is less than the target level of the output voltage VOUT1. Therefore, the DC/DC controller 914 regulates the output voltage VOUT1 to a target level.

By way of example, and not limitation, terminals of the driver controller 924 includes ISEN, OVP, VR, COMP, TS, BLON, PWM, and GATE. In the example of FIG. 9, there are multiple current sensing terminals, which receive current sensing signals ISEN_1, ISEN_2, . . . ISEN_N indicating currents through the LED strings in the illuminating module 926 respectively. The voltage sensing terminal OVP receives a voltage sensing signal VSEN indicating the voltage VOUT2 from a voltage sensor, e.g., a voltage divider 938 coupled to the secondary winding L2. The terminal VR receives a feedback signal VFB indicating the voltage VOUT1 from a voltage sensor, e.g., a voltage divider 920 coupled to the secondary winding L1. When the voltage of the feedback signal VFB is greater than a target regulation voltage or the voltage of the voltage sensing signal VSEN is greater than a predetermined safety voltage, the driver controller 924 reduces the input power to the primary winding LP, in one embodiment. More specifically, when the compensation signal VCOMP is pulled to zero, the current through the optocoupler 916 (i.e., the feedback signal FB) is increased to a maximum value. Thus, the DC/DC controller 914 decreases the duty cycle of the control signal DRV1 to prevent an over-voltage condition of the illuminating module 926 and the control module 928. The driving terminal GATE generates a control signal DRV3 according to the current sensing signals ISEN_1, ISEN_2, . . . ISEN_N and the voltage sensing signal VSEN to control the switch Q3 so as to regulate VOUT2 to a target voltage. In one embodiment, the control signal DRV3 is a pulse modulation signal, e.g., a PWM signal. A current flows through the secondary winding L2 if the control signal DRV3 is in a first state (e.g., digital 0), and the current of the secondary winding L2 remains cut-off if the control signal DRV3 is in a second state (e.g., digital 1).

In the example of FIG. 9, the synchronous terminal TS receives a synchronous signal SYNC indicative of the operation frequency of the DC/DC controller 914 from the secondary winding, e.g., L1. The driving terminal GATE generates the control signal DRV3 based on the synchronous signal SYNC, the current sensing signals ISEN_1, ISEN_2, . . . ISEN_N, and the voltage sensing signal VSEN. The control signal DRV3 is used to regulate VOUT2 based on the power requirement of the illuminating module 926, and to synchronize the operation frequency of the driver controller 924 with the operation frequency of the DC/DC controller 914. The terminal PWM receives a dimming signal DIM from the control module 928. The terminal BLON receives an ON/OFF signal from the control module 928. The driver controller 924 controls the ON/OFF status and dimming of the illuminating module 926 based on the ON/OFF signal and the dimming signal DIM generated by the control module 928.

Figure 10:
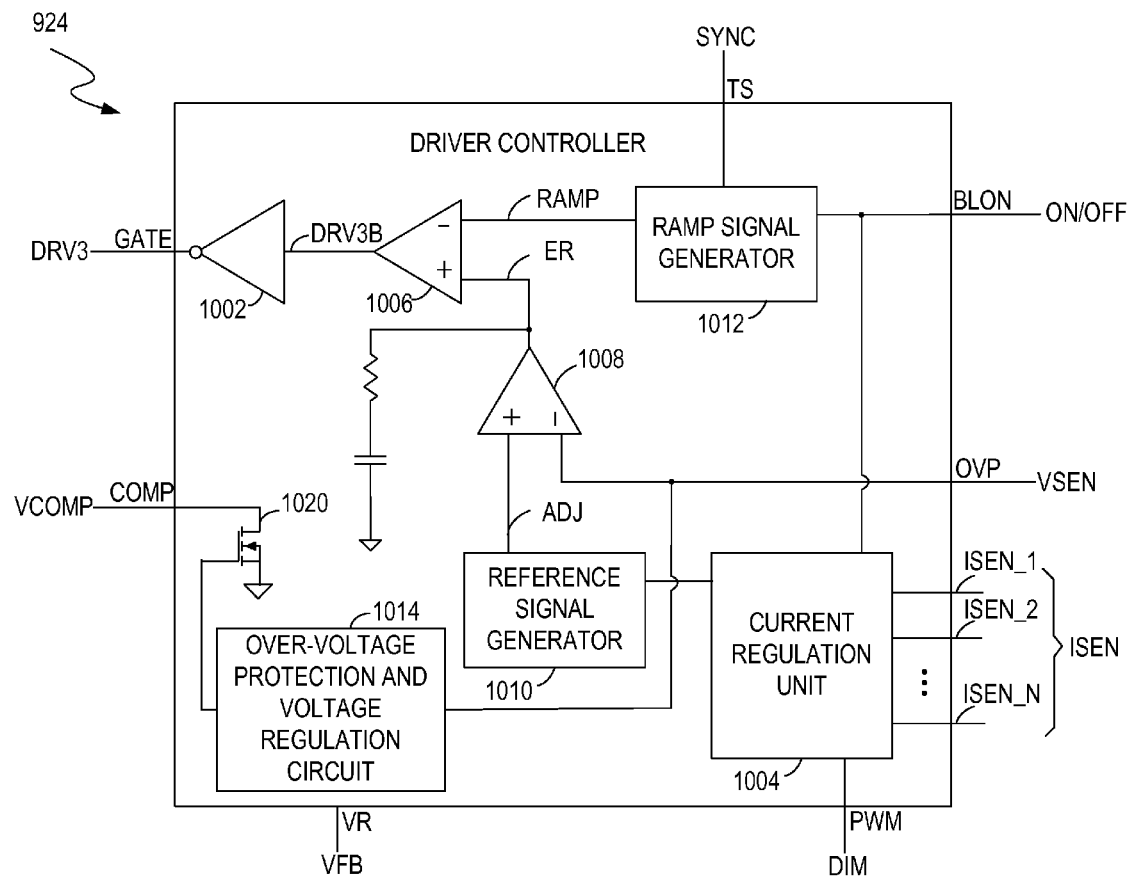
FIG. 10 illustrates an example of a driver controller in FIG. 9, in accordance with one embodiment of the present invention.

FIG. 10 illustrates an example of a driver controller 924 in FIG. 9, in accordance with one embodiment of the present invention. In the example of FIG. 10, the driver controller 924 includes a current regulation unit 1004, a reference signal generator 1010, an error amplifier 1008, a ramp signal generator 1012, a comparator 1006, an inverter buffer 1002, an over-voltage protection and voltage regulation circuit 1014, and a switch 1020 controlled by the over-voltage protection. FIG. 10 is described in combination with FIG. 9.

In one embodiment, the current regulation unit 1004 is operable for balancing the currents through the LED strings in the illuminating module 926 such that the current through each LED string is substantially the same according to a target current level. As used herein, the term "substantially the same" means that the current through the LED strings may vary but within a range so that the LED strings can generate desirable light outputs with a relatively uniform brightness.

Furthermore, the current regulation unit 1004 adjusts the output voltage VOUT2 to satisfy a power requirement of the illuminating module 926. More specifically, the current regulation unit 1004 adjusts the output voltage VOUT2 such that a voltage drop across each LED string is sufficient to enable each LED string to generate a current that is substantially the same as the target current level, in one embodiment. The current regulation unit 1004 receives the current sensing signals ISEN_1, ISEN_2, . . . ISEN_N indicating currents through the LED strings in the illuminating module 926 respectively. The current regulation unit 1004 controls the reference signal generator 1010 to control an ON/OFF status and dimming of the illuminating module 926 based on an ON/OFF signal and a dimming signal DIM respectively.

The reference signal generator 1010 is operable for generating a reference signal ADJ based on a power requirement of the illuminating module 926. In one embodiment, the current regulation unit 1004 can control the reference signal generator 1010 to increase or decrease the reference signal ADJ so as to increase or decrease the output voltage VOUT2. By way of example, the current regulation unit 1004 selects a sensing signal having the smallest level from the current sensing signals ISEN_1-ISEN_N. The current regulation unit 1004 increases the reference signal ADJ if the sensing signal having the smallest level is below a predetermined threshold, and decreases the reference signal ADJ if the sensing signal having the smallest level exceeds a predetermined threshold. Because the current sensing signal having the smallest level from the current sensing signals ISEN_1-ISEN_N corresponds to the LED string having the greatest forward voltage, adjusting the reference signal ADJ according to the sensing signal having the smallest level can satisfy the power requirement of all the LED strings in the illuminating module 926. The error amplifier 1008 is operable for receiving the reference signal ADJ and the voltage sensing signal VSEN indicative of VOUT2, and for generating an error signal ER by comparing the reference signal ADJ with the voltage sensing signal VSEN. If the reference signal ADJ increases, the error amplifier 1008 increases the error signal ER, in one embodiment.

The ramp signal generator 1012 is operable for receiving a synchronous signal SYNC indicative of an operation frequency of the DC/DC controller 914 from the secondary winding L1. The ramp signal generator 1012 generates a ramp signal RAMP based on the synchronous signal SYNC to synchronize an operation frequency of the driver controller 924 with the operation frequency of the DC/DC controller 914. More specifically, when the control signal DRV1 is in a first state (e.g., digital 1), the switch Q1 is on. The current $I_{LP}$ flows through the primary winding LP and there is no current flowing through the secondary winding L1. The voltage of the synchronous signal SYNC is at a first level. When the control signal DRV1 is in a second state (e.g., digital 0), the switch Q1 is off and the current $I_{L1}$ flows through the secondary winding L1. The voltage of the synchronous signal SYNC is at a second level. Accordingly, the driver controller 924 detects the operation frequency of the DC/DC controller 914 based on the voltage level of the synchronous signal SYNC. When the voltage of the synchronous signal SYNC is at the first level, the ramp signal generator 1012 stops generating the ramp signal RAMP. When the voltage of the synchronous signal SYNC is at the second level, the ramp signal generator 1012 generates the ramp signal RAMP.

The comparator 1006 is operable for comparing the error signal ER with the ramp signal RAMP to generate a signal DRV3B based on the power requirement of illuminating module 926. In one embodiment, the inverter buffer 1002 inverts the signal DRV3B and outputs a control signal DRV3 to control the switch Q3, e.g., a PMOSFET, coupled in series with the secondary winding L2. In the example of FIG. 10, the signal DRV3B and the control signal DRV3 are pulse modulation signals, e.g., PWM signals. If the control signal DRV3 is in a first state (e.g., digital 0), the switch Q3 is on. If the control signal DRV3 is in a second state (e.g., digital 1), the switch Q3 is off. A duty cycle of DRV3 is determined by the error signal ER. If the error signal ER increases, the comparator 1006 increases a duty cycle of the control signal DRV3B, in one embodiment. Consequently, the conduction duty cycle of the switch Q3 is increased. Therefore, an average current flowing through the secondary winding L2 is increased and thus the output voltage VOUT2 is increased.

Furthermore, the driver controller 924 detects the operation frequency of the DC/DC controller 914 and generates the control signal DRV3 based on the synchronous signal SYNC. More specifically, when the voltage of the synchronous signal SYNC is at the second level, the ramp signal generator 1012 generates the ramp signal RAMP. The comparator 1006 compares the error signal ER with the ramp signal RAMP to generate the signal DRV3B and then the inverter buffer 1002 outputs the control signal DRV3. When the voltage of the synchronous signal SYNC is at the first level, the ramp signal generator 1012 stops generating the ramp signal RAMP and the voltage of the ramp signal RAMP remains at a predetermined maximum value. In the example of FIG. 10, the comparator 1006 compares the error signal ER with the predetermined maximum value of the ramp signal RAMP to output a logic 0 (DRV3B), then the inverter buffer 1002 outputs a logic 1 (DRV3) to turn off the switch Q3 (for example, the switch Q3 is a PMOSFET). Therefore, the operation frequency of the driver controller 924 at the secondary side is synchronized with the operation frequency of the DC/DC controller 914 at the primary side so as to avoid audible noise due to the frequency beating between the DC/DC controller 914 and the driver controller 924.

In one embodiment, the driver controller 924 further includes the switch 1020 coupled between the over-voltage protection and voltage regulation circuit 1014 and ground. The over-voltage protection and voltage regulation circuit 1014 turns on the switch 1020 to pull the compensation signal VCOMP to zero when the voltage of the feedback signal VFB is greater than the target regulation voltage or when the voltage of the voltage sensing signal VSEN is greater than the predetermined safety voltage. As a result, the current through the optocoupler 916 (i.e., the feedback signal FB) is increased to a maximum value. Thus, the DC/DC controller 914 decreases the duty cycle of the control signal DRV1. When the voltage of the feedback signal VFB is less than the target regulation voltage and the voltage of the voltage sensing signal VSEN is less than the predetermined safety voltage, the over-voltage protection and voltage regulation circuit 1014 turns off the switch 1020. Therefore, the driver controller 924 prevents an over-voltage condition of the illuminating module 926 and the control module 928.

Figure 11:
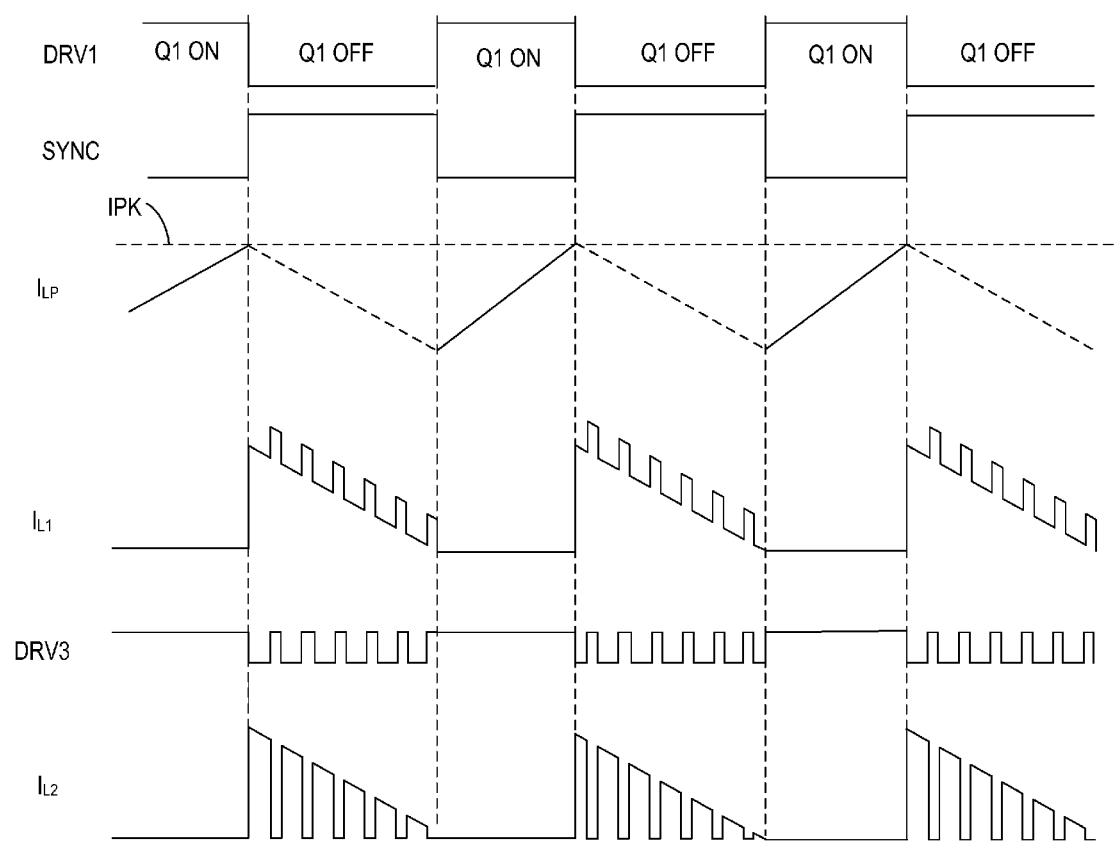
FIG. 11 illustrates an example of waveforms associated with the display system in FIG. 9, in accordance with one embodiment of the present invention.

FIG. 11 illustrates an example of waveforms associated with the display system 900 in FIG. 9, in accordance with one embodiment of the present invention. FIG. 11 is described in combination with FIG. 9. More specifically, FIG. 11 shows the control signal DRV1 generated by the DC/DC controller 914, the status of the switch Q1, the voltage of the synchronous signal SYNC, the current $I_{LP}$ flowing through the primary winding LP, the current $I_{L1}$ flowing through the secondary winding L1, the control signal DRV3 generated by the driver controller 924, and the current $I_{L2}$ flowing through the secondary winding L2.

In operation, the DC/DC controller 914 receives the sensing signal LPSEN indicating the current $I_{LP}$ flowing through the primary winding LP, and generates the control signal DRV1 to control the switch Q1. If the DRV1 is in a first state, e.g., digital 1, the switch Q1 is on, and the current $I_{LP}$ flowing through the primary winding LP increases. When the switch Q1 is on, there is no current flowing through the secondary windings L1 and L2 because a diode D1 coupled to the secondary winding L1 and a diode D2 coupled to the secondary winding L2 are both reverse-biased. The voltage of the synchronous signal SYNC is at a first level. When the voltage of the sensing signal LPSEN increases to a predetermined voltage, which indicates that the current $I_{LP}$ reaches a predetermined current level IPK, the DC/DC controller 914 generates the control signal DRV1 in a second state, e.g., digital 0, to turn off the switch Q1. The current $I_{L1}$ flows through the secondary winding L1 and the voltage of the synchronous signal SYNC is at a second level.

When the switch Q1 is off, the current $I_{LP}$ of the primary winding LP decreases to zero, in one embodiment. A current $I_{L1}$ of the secondary winding L1 and a current $I_{L2}$ of the secondary winding L2 decreases and are both regulated by the switch Q3. The conductance state of the switch Q3 is controlled by the control signal DRV3. For example, when the control signal DRV3 is in a first state (e.g., digital 0), the switch Q3 is on. When the control signal DRV3 is in a second state (e.g., digital 1), the switch Q3 is off. Assume that the number of turns of the primary winding LP is NP, the number of turns of the secondary winding L1 is N1, and the number of turns of the secondary winding L2 is N2. If the control signal DRV3 is in the first state (e.g., digital 0), the switch Q3 is on. Thus, the current $I_{L1}$ flows from the secondary winding L1 through the diode D1 to the control module 928, and the current $I_{L2}$ flows from ground through the switch Q3, the secondary winding L2, the diode D2 to the illuminating module 926. When the switch Q3 is on, and $I_{L1}$ and $I_{L2}$ can be given by:

$$NP*I_{LP}=N1*I_{L1}+N2*I_{L2}. \quad (7)$$

If the control signal DRV3 is in the second state (e.g., digital 1), the switch Q3 is off and $I_{L2}$ remains cut-off. When the switch Q3 is off, $I_{L1}$ can be given by:

$$NP*I_{LP}=N1*I_{L1}. \quad (8)$$

To illustrate the relationship among the current $I_{LP}$, $I_{L1}$, and $I_{L2}$, we suppose the current $I_{LP}$ decreases to zero gradually. In one embodiment, the transformer 932 operates in a constant frequency mode in which the control signal DRV1 has a fixed frequency and an adjustable duty cycle. In another embodiment, both the frequency and the duty cycle of the control signal DRV1 are adjustable.

In one embodiment, the driver controller 924 generates the control signal DRV3 based on the synchronous signal SYNC. More specifically, the control signal DRV3 remains at the second state (e.g., digital 1) to turn off the switch Q3 if the voltage of the synchronous signal SYNC is at the first level. The control signal DRV3 includes multiple pulses to alternately turn on and turn off the switch Q3 if the voltage of the synchronous signal SYNC is at the second level. Advantageously, the operation frequency of the driver controller 924 at the secondary side is synchronized with the operation frequency of the DC/DC controller 914 at the primary side to avoid audible noise due to the frequency beating between the DC/DC controller 914 and the driver controller 924.

As described in relation to FIG. 9 and FIG. 11, the DC/DC controller 914 regulates the output voltage VOUT1 generated at the secondary winding L1 by controlling the input power to the primary winding LP. More specifically, the DC/DC controller 914 controls the switch Q1 coupled in series with the primary winding LP based on the feedback signal FB and the sensing signal LPSEN. The feedback signal FB indicates the target level of the output voltage VOUT1. The sensing signal LPSEN indicates the current $I_{LP}$ of the primary winding LP. The driver controller 924 regulates the output voltage VOUT2 generated at the secondary winding L2 by controlling the switch Q3 coupled in series with the secondary winding L2 based on the current sensing signals ISEN_1, ISEN_2, . . . ISEN_N, the voltage sensing signal VSEN, and the synchronous signal SYNC. The current sensing signals ISEN_1, ISEN_2, . . . ISEN_N indicate the currents through the LED strings in the illuminating module 926 respectively. The voltage sensing signal VSEN indicates the output voltage VOUT2. The synchronous signal SYNC indicates the operation frequency of the DC/DC controller 914. As a result, the boost converter 122 in the conventional display system 100 or the DC/DC controller 216, the transformer 232 and the optocoupler 234 in the conventional display system 200 can be eliminated, and thus the cost is reduced.

Figure 12:
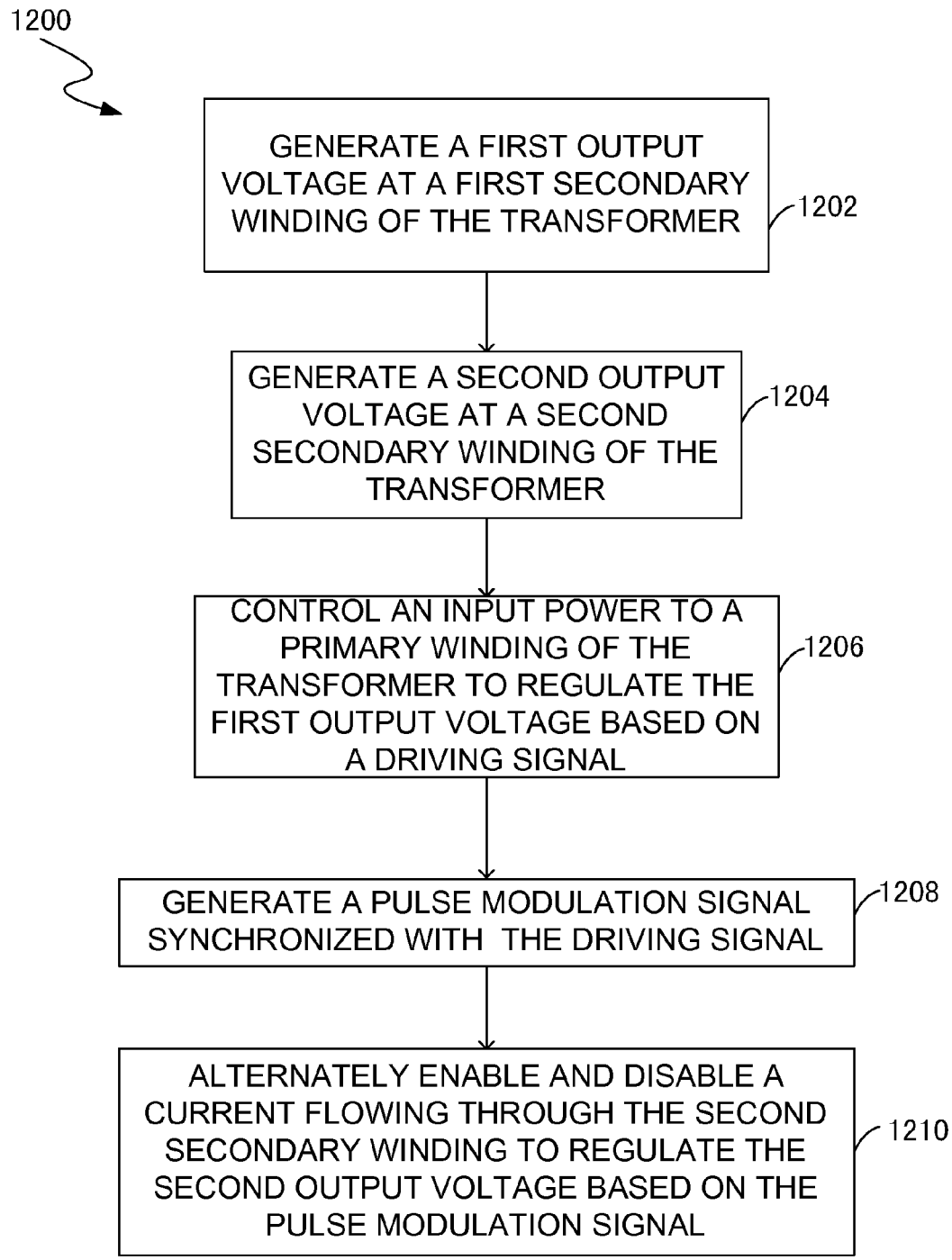
FIG. 12 illustrates a flowchart of a method for controlling a transformer to generate multiple output voltages, in accordance with one embodiment of the present invention.

FIG. 12 illustrates a flowchart of a method for controlling a transformer to generate multiple output voltages, in accordance with one embodiment of the present invention. FIG. 12 is described in combination with FIG. 9.

In block 1202, a first output voltage is generated at a first secondary winding L1 of a transformer (e.g., the transformer 932 in FIG. 9). In block 1204, a second output voltage is generated at a second secondary winding L2 of the transformer. In block 1206, an input power received by the transformer at a primary winding LP is controlled to regulate the first output voltage based on a driving signal, e.g., a driving signal DRV1 generated by a DC/DC controller 914.

In block 1208, a pulse modulation signal is generated (e.g., a pulse modulation signal DRV3 generated by a driver controller 924 in FIG. 9). In one embodiment, the pulse modulation signal is synchronized with the driving signal. In block 1210, a current flowing through the second secondary winding L2 is alternately enabled and disabled to regulate the second output voltage based on the pulse modulation signal. For example, a switch (e.g., the switch Q3 in FIG. 9) coupled to the second secondary winding L2 is controlled by the pulse modulation signal to regulate the second output voltage. If the pulse modulation signal is in a first state, the switch is on, a current flows through the second secondary winding L2 to a load. If the pulse modulation signal is in a second state, the switch is off, and the current of the second secondary winding L2 remains cut-off.

Accordingly, the present invention provides DC/DC converters with multiple regulated outputs. The DC/DC converters control input power to a primary winding of a transformer to regulate a first output voltage generated by a first secondary winding, and control a switch coupled to a second secondary winding of the transformer to regulate a second output voltage generated by the second secondary winding. The DC/DC converters according to the present invention can be used in display systems. As such, the extra components such as a boost converter or a second transformer used in the prior arts for regulating the second output voltage can be eliminated, and thus the cost is reduced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A DC/DC converter comprising:
   a transformer having a primary winding coupled to a power source, a first secondary winding operable for providing a first output voltage to a first load, and a second secondary winding operable for providing a second output voltage to a second load;
   a switch controller, coupled to said primary winding, and operable for controlling a first switch coupled to said primary winding so as to control input power to said primary winding and to regulate said first output voltage based on a power requirement of said first load; and
   a driver controller, coupled to said second secondary winding, and operable for generating a pulse modulation signal to alternately turn on and turn off a second switch coupled to said second secondary winding to regulate said second output voltage based on a power requirement of said second load, wherein said driver controller further receives a synchronous signal indicative of an operation frequency of said switch controller from said first secondary winding and generates said pulse modulation signal based on said synchronous signal to synchronize an operation frequency of said driver controller with said operation frequency of said switch controller.

2. The DC/DC converter of claim 1, wherein said transformer further comprises an auxiliary winding operable for providing supply voltage to said switch controller.

3. The DC/DC converter of claim 1, wherein a source of said second switch receives said first output voltage from said first secondary winding.

4. The DC/DC converter of claim 1, wherein said DC/DC converter further comprises a transient voltage suppressor coupled between a source and a drain of said second switch.

5. The DC/DC converter of claim 1, wherein said switch controller generates a pulse-width modulation (PWM) signal to alternately turn on and turn off said first switch, and regulates said first output voltage by adjusting a duty cycle of said PWM signal.

6. The DC/DC converter of claim 1, wherein said pulse modulation signal remains at a constant level to turn off said second switch if a voltage of said synchronous signal is at a first level, and wherein said pulse modulation signal comprises a plurality of pulses to alternately turn on and turn off said second switch if said voltage of said synchronous signal is at a second level.

7. The DC/DC converter of claim 1, wherein when a voltage of a feedback signal indicating that said first output voltage is greater than a target regulation voltage or when a voltage of a sensing signal indicating that said second output voltage is greater than a predetermined safety voltage, said driver controller reduces said input power to said primary winding.

8. The DC/DC converter of claim 1, wherein said driver controller comprises:
   a reference signal generator, operable for generating a reference signal based on said power requirement of said second load; and
   an error amplifier, operable for receiving said reference signal and a sensing signal indicative of said second output voltage, and operable for generating an error signal by comparing said reference signal with said sensing signal.

9. The DC/DC converter of claim 8, wherein said second load comprises a plurality of light sources, and wherein said driver controller further comprises a current regulation unit operable for balancing currents through said plurality of light sources.

10. The DC/DC converter of claim 8, wherein said driver controller further comprises a comparator operable for comparing said error signal with a ramp signal to generate said pulse modulation signal.

11. A driver controller for controlling a first output voltage delivered from a transformer to a first load, said driver controller comprising:
   a synchronous terminal, operable for receiving a synchronous signal indicative of an operation frequency of a switch controller from a first secondary winding of said transformer;
   a voltage sensing terminal, operable for receiving a voltage sensing signal indicative of said first output voltage;
   a current sensing terminal, operable for receiving a current sensing signal indicating a current through said first load; and
   a driving terminal, operable for generating a pulse modulation signal based on said synchronous signal, said voltage sensing signal, and said current sensing signal to regulate said first output voltage, and to synchronize an operation frequency of said driver controller with said operation frequency of said switch controller, wherein said driver controller is coupled to a second secondary winding of said transformer, and wherein said switch controller generates a pulse-width modulation (PWM) signal to alternately turn on and turn off a first switch coupled to a primary winding of said transformer and controls input power to said primary winding to regulate a second output voltage by adjusting a duty cycle of said PWM signal.

12. The driver controller of claim 11, wherein said pulse modulation signal alternately turns on and turns off a second switch coupled to said second secondary winding to regulate said first output voltage based on a power requirement of said first load.

13. The driver controller of claim 12, wherein a source of said second switch receives said second output voltage from said first secondary winding.

14. The driver controller of claim 11, wherein a current flows through said second secondary winding if said pulse modulation signal is in a first state, and wherein said current of said second secondary winding remains cut-off if said pulse modulation signal is in a second state.

15. The driver controller of claim 14, wherein said pulse modulation signal remains at said second state if a voltage of said synchronous signal is at a first level, and wherein said pulse modulation signal comprises a plurality of pulses if said voltage of said synchronous signal is at a second level.

16. The driver controller of claim 11, wherein said first load comprises a plurality of light sources, and wherein said driver controller further comprises a current regulation unit operable for balancing a plurality of currents through said plurality of light sources.

17. The driver controller of claim 16, wherein said current regulation unit receives said current sensing signal, and controls an ON/OFF status and dimming of said plurality of light sources based on an ON/OFF signal and a dimming signal respectively.

18. The driver controller of claim 11, wherein when a voltage of a feedback signal indicating said second output voltage is greater than a target regulation voltage or when a voltage of said voltage sensing signal is greater than a predetermined safety voltage, said driver controller reduces said input power to said primary winding.

19. The driver controller of claim 18, wherein said driver controller further comprises a third switch coupled between an over-voltage protection circuit and ground, and wherein said over-voltage protection circuit turns on said third switch to pull a compensation signal to zero when said voltage of said feedback signal is greater than said first predetermined safety voltage or when said voltage of said voltage sensing signal is greater than said second predetermined safety voltage.

* * * * *